United States Patent [19]

Vance et al.

[11] Patent Number: 4,506,262

[45] Date of Patent: Mar. 19, 1985

[54] SYNCHRONIZATION OF DIGITAL RADIO PAGER

[75] Inventors: Ian A. W. Vance, Newport; Colin Jeffrey, Stansted Mountfitchet; Brian A. Bidwell, Luton; David F. A. Leevers, Harlow; Michael J. A. Woodley, Hitchin, all of England

[73] Assignee: International Standard Electric Corporation, New York, N.Y.

[21] Appl. No.: 398,472

[22] Filed: Jul. 15, 1982

[30] Foreign Application Priority Data

Jul. 27, 1981 [GB] United Kingdom ............... 8123063

[51] Int. Cl.³ .......................... H04Q 9/00; H04B 1/16
[52] U.S. Cl. ............................... 340/825.44; 375/114
[58] Field of Search ...................... 340/825.44, 825.48; 455/51; 375/81, 100, 106, 108, 114

[56] References Cited

U.S. PATENT DOCUMENTS 4,001,693 1/1977 Stackhouse et al. ............... 455/51
4,229,822 10/1980 Bench ................................. 375/81
4,353,065 10/1982 Mori ............................. 340/825.44

Primary Examiner—Donald J. Yusko
Attorney, Agent, or Firm—John T. O'Halloran; Peter R. Ruzek

[57] ABSTRACT

A method of synchronizing a digital radio pager receiver with incoming digital data signals. At switch-on the receiver first attains a "course" bit synch during the first quarter-word period and then a "fine" bit synch during the next half-word period. The receiver then examines incoming data bits to determine simultaneously (a) whether valid data is being received and (b) whether the incoming data contains a preamble sequence. If either determination is successful the incoming data is then examined to determine whether it contains a synchronizing word or an address word. The synchronization and address word determination is also carried out while bit synch is obtained and the valid data/preamble determination is effected.

17 Claims, 3 Drawing Figures

SYNCHRONIZATION OF DIGITAL RADIO PAGER

BACKGROUND OF THE INVENTION

The present invention relates to a synchronization arrangement for a digital radio pager.

A digital radio pager is required to receive and process reliably broadcast digital signals which may be noisy and jittery at the point of reception. Moreover, it must be able to achieve reliable operation very quickly after initial start-up, or regain reliable operation after any interruption in the received digital data stream, e.g., when emerging from an area where radio reception is masked, such as in a tunnel or under a bridge. At the same time the receiver must utilize efficient battery saving techniques.

To appreciate the constraints placed upon a digital radio pager receiver consider the public radiopaging service currently under development by British Telecommunications. The full specification for the Standard Code Format is to be found in the Final Report of the British Post Office Code Standardisation Advisory Group (POCSAG). Suffice it to say that each address is transmitted only once and consists of a 32-bit digital code word transmitted in a batch of words, each batch comprising a synchronization code word followed by 8 frames each containing two code words. Each transmission starts with a preamble to permit the pagers to attain bit synchronization and to prepare them to acquire word synchronization. Since a pager may be switched on at any time, or emerge from a masked area at any time, it is desirable that it can attain bit and word synchronization, discriminating between true data and random noise, in a minimum time. The first complete transmission including associated preamble received after switch-on must be fully effective so far as the user is concerned.

SUMMARY OF THE INVENTION

An object of the present invention is to provide an improved digital radio pager in which bit and word synchronization is obtained in a minimum of time after switch-on or upon emerging from a masked area.

A feature of the present invention is the provision of a digital radio pager receiver comprising a timing control circuit; first means coupled to the control circuit and incoming data signals for periodically establishing bit synchronization of the receiver to the incoming data signals by adjusting the control circuit within a first predetermined number of data bit periods; second means coupled to the control circuit and the first means to determine reception of valid data bits during a second predetermined number of data bit periods immediately succeeding the first bit periods; third means coupled to the incoming signals and the control circuit to compare incoming bit patterns with locally generated bit sequences during the second bit periods, the second means and the third means operating simultaneously during the second bit periods; and fourth means coupled to the second means and the third means responsive to a positive output from either or both of the second means and the third means to produce a control signal to control the operation of the receiver for a further period of time.

Another feature of the present invention is the provision of a method of synchronizing a digital radio pager receiver with incoming digital data signals comprising the steps of attaining bit synchronization of a receiver timing control circuit with incoming data bits within a predetermined number of bit periods from the time the receiver is switched on; determining simultaneously whether the incoming signals are conveying valid data and whether the incoming signals contain a data sequence corresponding to a locally generated sequence; causing the receiver to remain operative during a succeeding period of time when either or both portions of the determining step is or are successful; and examining the incoming data signals during the succeeding period of time to determine whether it contains a data sequence corresponding to a selected one of a locally stored synchronization and address code word.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
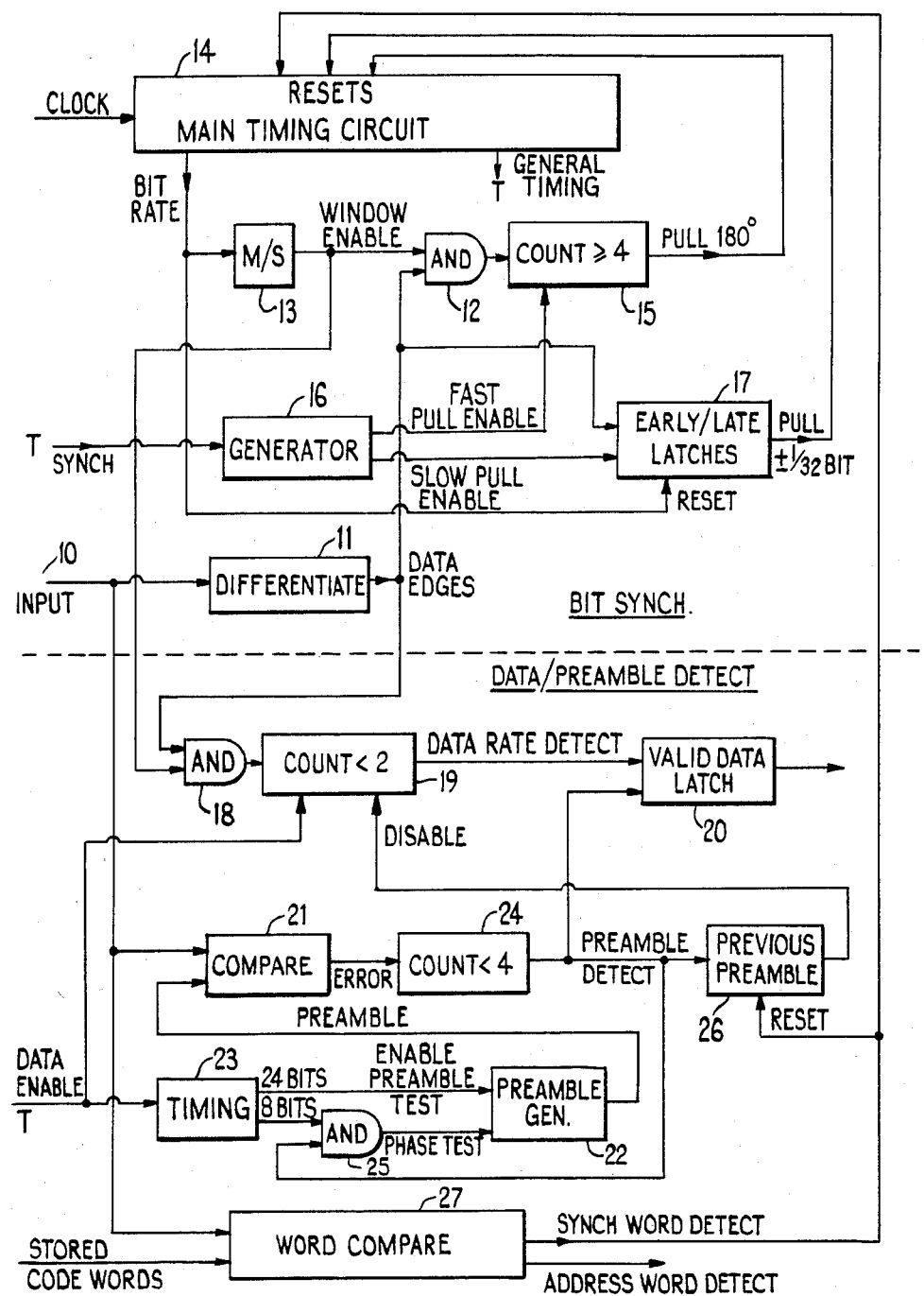
FIG. 1 is a block diagram of a synchronization arrangement for a digital radio pager in accordance with the principles of the present invention.
Figure 2:
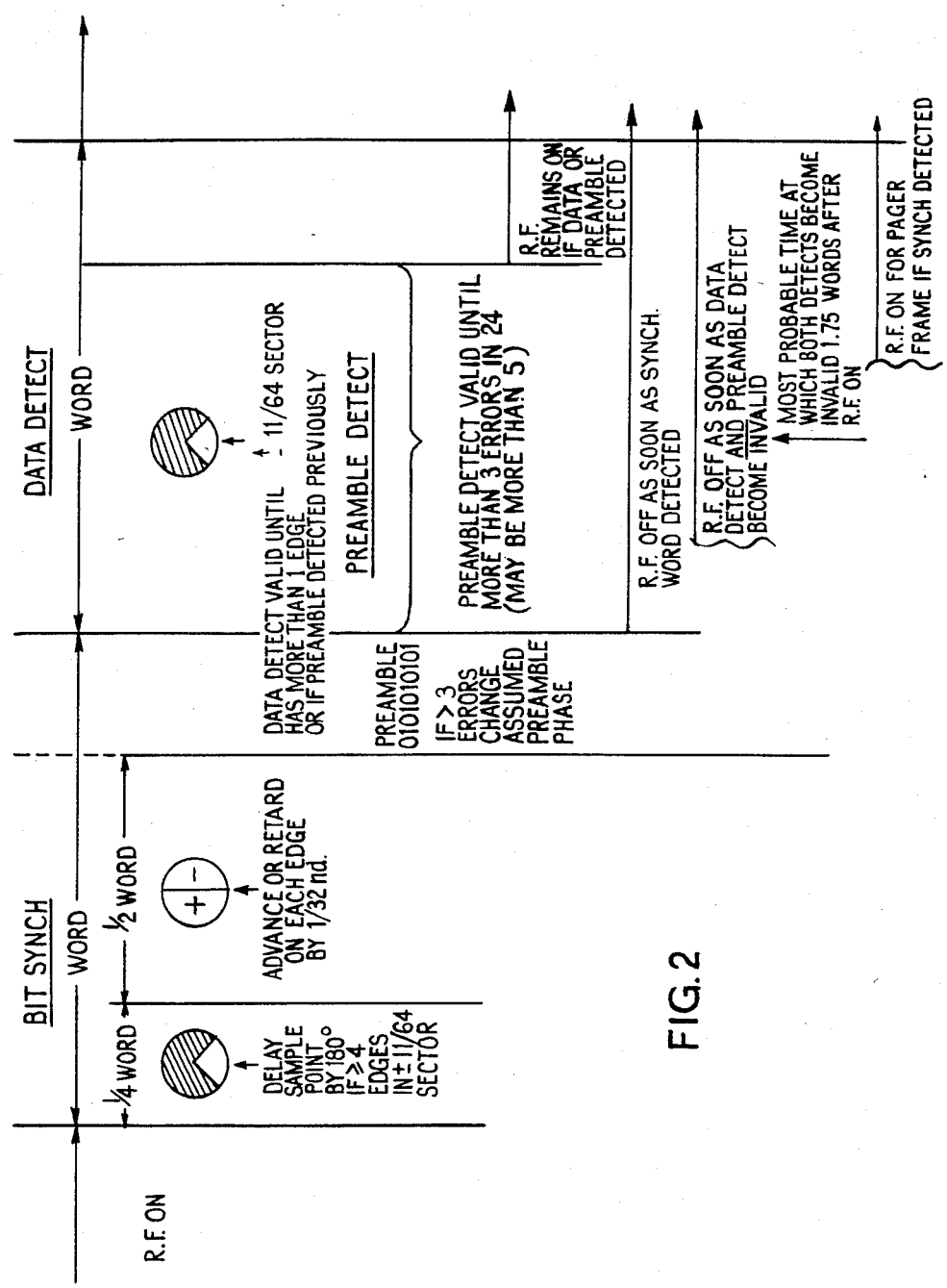
FIG. 2 illustrates a typical synchronization sequence to obtain synchronization of the radio pager.
Figure 3:
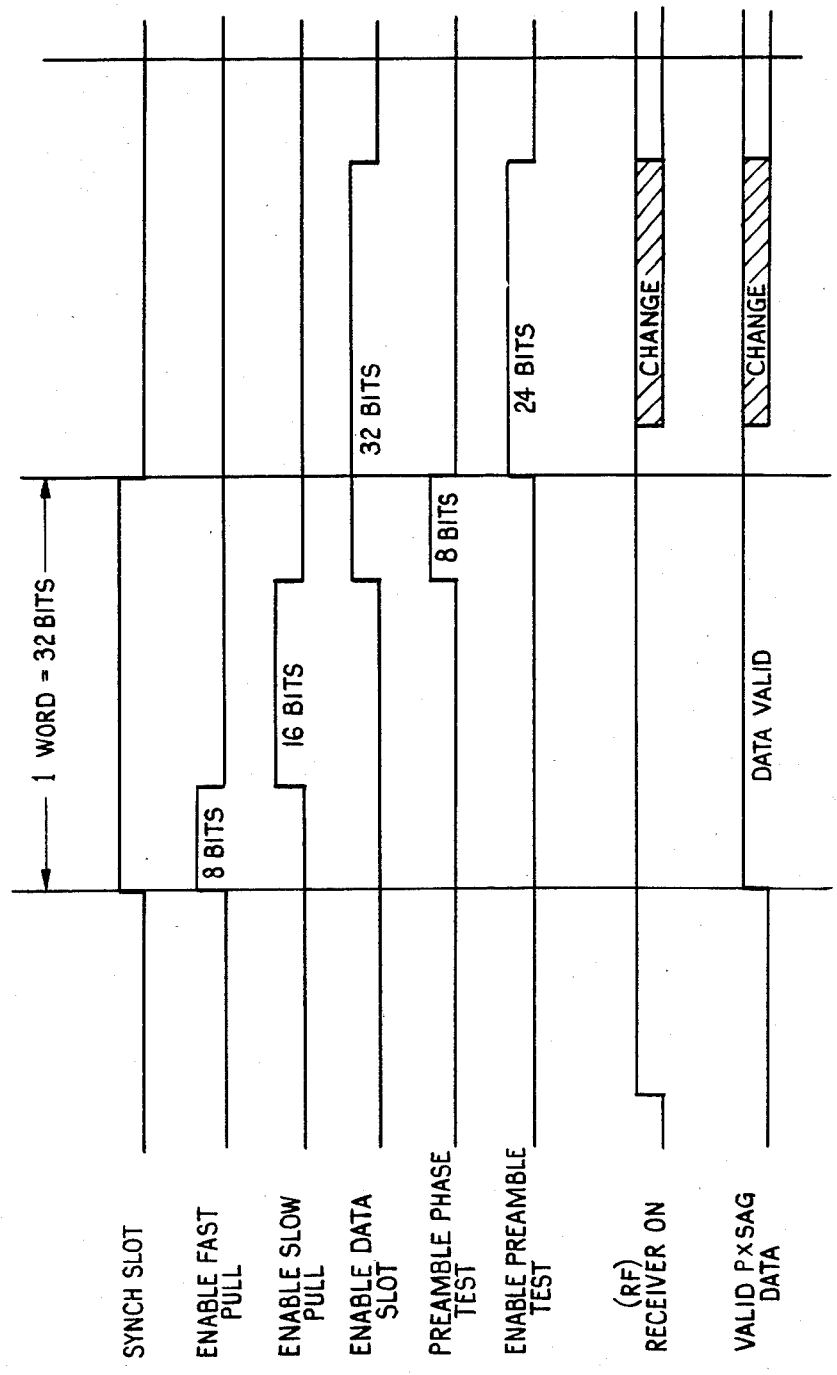
FIG. 3 is a timing diagram relating to FIG. 1.

The various elements shown in block form in FIG. 1 are each, in themselves, composed of conventional electronic circuits and can be readily constructed by those skilled in the art. The following description refers to all three Figures.

The demodulated radio signals received by the pager are presented as a digital data stream at terminal 10. This stream may be genuine digital data, i.e., preamble, synchronization word or address code word, or it may be false data, i.e., noise. To attain bit synchronization the incoming data is first applied to a data differentiator 11 which produces short pulses corresponding to the data pulse edges. The data edges are fed to an AND gate 12 together with a "window enable" pulse from a monostable 13 which is driven by bit rate clock pulses from a main timing circuit 14. The monostable 13 produces enabling pulses which have, in this example, $\pm 11/64$ of a bit period centered on an assumed bit sample point. The output of AND gate 12 is fed to a counter 15 which counts the number of data edges occurring in the window. If the number of edges counted equals or exceeds 4 during the first quarter of a word period (assuming a 32-bit word) a signal from counter 15 is applied to the main timing circuit 14 to cause a 180° phase shift in the bit rate clock applied to the monostable 13. The first quarter of the word period (8 bits) during which counter 15 operates is determined by a synchronization slot timing generator 16 which is slaved to the main timing circuit 14. Output T of 14 feeds generator 16, a counter 19 and a subsidiary timing circuit 23. The control from timing generator 16 to counter 15 may conveniently be termed a "fast pull enable" signal. During the next half word (16 bits) a "slow pull enable" signal from generator 16 is fed to a set input of "early/late" latches 17, together with the data edges from differentiator 11 and the bit rate signal. The latches compare the data edge timing with that of the sample point as obtained from the bit rate clock. If there is a discrepancy, e.g., if the first data edge is "early" or "late" a signal from the latches 17 is sent to the main timing circuit 14 to adjust the bit rate clock by ±1/32 of a bit period to reduce the discrepancy. This process is repeated on each succeeding data edge until the edge pulses and the sample point are 180° apart. A maximum of sixteen edge pulses is allowed to achieve this condition. In practice the edge pulses will never coincide exactly with the ideal position, usually the circuit will hover about the ideal sample point by ±1/32 of a bit period. The sequence so far described may be termed the "bit synchronization" sequence and lasts for a total of ¾ word (24 bits).

At the conclusion of the bit synchronization sequence two further data validation operations occur in parallel. One is a "data detect" sequence and the other is a "preamble detect" sequence. The incoming data on terminal 10 is assumed initially to be valid data until proven otherwise. Therefore, at the conclusion of the bit synchronization process the succeeding ±11/64 window enable pulses produced by the monostable 13 are fed to an AND gate 18 together with the data edges from differentiator 11. The output of gate 18 goes to a counter 19 which is enabled from the timing circuit 14 by signal T. Counter 19 should count no more than 1 data edge during each ±11/64 window which by now is centered on the correct sample point. Since the input data is initially assumed valid, a "valid data" latch 20 is pre-set to record this condition. Provided counter 19 does not exceed a count of 1 latch 20 remains set. If counter 19 reaches a count of 2, thus, indicating an error, then latch 20 is reset. Meanwhile, the input data is simultaneously fed to a comparator 21 where it is compared with a locally generated preamble sequence from a generator 22. Generator 22 is controlled by the subsidiary timing circuit 23. For the next quarter word (8 bits) the phase of the preamble is found. The output of comparator 21 is fed to a counter 24 and if more than 3 errors are counted the phase of the preamble generator 22 is changed via a feedback signal from counter 24 applied through gate 25. Assuming that at the end of the 8 bits (the last quarter of the first 32-bit word) the preamble generator phase is correct, then for the next 24 bits (¾ word) the locally generated preamble (a simple 01010101 . . . sequence in the POCSAG code) is compared with the incoming data. If now more than 3 errors are counted by counter 24, the preamble is deemed invalid and latch 20 is reset. If 3 or fewer errors are counted in 24 bits, the preamble is deemed valid and latch 20 remains set. If the preamble is detected then in the next acquisition sequence the receiver must detect either data or a subsequent preamble. Therefore, when the preamble is detected by counter 24 not only does latch 20 remain set but a "previous preamble" latch 26 is also set. This latch 26 will disable counter 19 during the next acquisition sequence, because it is assumed that successful detection of the preamble also indicates that a correct data rate is being achieved. Hence, if either the correct data rate is determined by counter 19 or a valid preamble is determined by counter 24 then latch 20 remains set to indicate valid data and the receiver circuitry remains switched on, because the succeeding incoming data will contain either a synchronization word or an address word. Meanwhile, the input data is simultaneously fed to a word comparator 27 where it is compared with locally stored synchronization and address code words. If the synch word is detected then the main timing circuit 14 is re-aligned with the synch word. At the same time the "previous preamble" latch 26 is reset. As soon as the synch word is detected the receiver circuitry is turned off to conserve battery power until the allotted address time slots for the receiver are due. The receiver is then turned on for the duration of the allotted time slots and the incoming data, if any, is compared with the stored address words by comparator 27. The receiver is also turned off if both counters 19 and 24 have failed to set latch 20. This occurs some time between bits 4 and 24, and the receiver is then turned on 16½ words later (the POCSAG preamble being 18 words long and the receiver is allowed ½ word period to come into full operation).

Thus, to summarize, the receiver first acquires bit synchronization and then simultaneously looks for (a) data having a valid bit rate, (b) a valid preamble, and (c) a synchronization word or address word.

While we have described above the principles of our invention in connection with specific apparatus, it is to be clearly understood that this description is made only by way of example and not as a limitation to the scope of our invention as set forth in the objects thereof and in the accompanying claims.

We claim:
1. A control arrangement for a digital radio pager receiver comprising:
    a timing control circuit;
    first means coupled to said control circuit and incoming data signals for periodically establishing bit synchronization of said receiver to said incoming data signals by adjusting said control circuit within a first predetermined number of data bit periods;
    second means coupled to said control circuit and to said first means to determine reception of valid data bits during a second predetermined number of data bit periods immediately succeeding said first bit periods;
    third means coupled to said incoming signals and said control circuit to compare incoming bits patterns with locally generated bit sequences during said second bit periods, said second means and said third means operating simultaneously during said second bit periods; and
    fourth means coupled to said second means and to said third means and responsive to a position output from said second and third means to produce a control signal to continue the operation of said receiver for a further period of time and to a negative output from said second and third means to discontinue the operation of the receiver for a predetermined period of time.

2. The arrangement according to claim 1, wherein said first means includes
    fifth means coupled to said incoming signals to produce pulses corresponding to data pulse edges,
    sixth means coupled to said control circuit to produce a pulse of predetermined duration and timing with reference to an assumed data bit rate clock produced by said control circuit,
    seventh means coupled to said fifth means and said sixth means responsive to said edge pulses and said predetermined duration pulse to count the number of said edge pulses occurring during said predetermined duration pulse, and
    eighth means coupled between said seventh means and said control circuit to effect a 180° phase shift in said bit rate clock if the number of said edge pulses counted during said predetermined duration pulse exceeds a preset limit during a given number of said first bit periods.

3. The arrangement according to claim 2, wherein said first means further includes
    ninth means coupled to said control circuit and said fifth means to compare, during a further given number of said first bit period, the timing of said edge pulses with respect to said bit rate clock, and
    tenth means coupled between said ninth means and said control circuit to effect incremental adjustments in said bit rate clock to reduce any discrepancy in timing between said edge pulses and said bit rate clock.

4. The arrangement according to claims 2 or 3, wherein
    said second means includes
        a first counter coupled to said fourth means,
        eleventh means coupled to said first counter, said fifth means and said sixth means to enable said first counter to count said edge pulse during each of said predetermined duration pulse, said first counter providing a first input to said fourth means when the count thereof exceeds a first preset number to cause said fourth means to disable said receiver for said further period of time.

5. The arrangement according to claim 4, wherein said third means includes
    twelfth means to generate said local bit sequences,
    thirteenth means coupled to said twelfth means and said control circuit responsive to a signal from said control circuit to enable said twelfth means during said second bit periods,
    fourteenth means coupled to said incoming data signals and said twelfth means to compare said incoming data bits with said local bit sequences, and
    a second counter coupled to said fourteenth means to count the number of comparison errors, said second counter providing a second input to said fourth means when the count thereof exceeds a second preset number to cause said fourth means to disable said receiver for said further period of time.

6. The arrangement according to claim 5, further including
    fifteenth means coupled to said incoming data signals and said control circuit to compare said incoming data bits with stored synchronization and address code words to generate an output when said incoming data signals correspond to said synchronization code word, said output being coupled to said control circuit for alignment thereof with a received synchronization code word.

7. The arrangement according to claim 4, further including
    twelfth means coupled to said incoming data signals and said control circuit to compare said incoming data bits with stored synchronization and address code words to generate an output when said incoming data signals correspond to said synchronization code word, said output being coupled to said control circuit for alignment thereof with a received synchronization code word.

8. The arrangement according to claims 2 or 3, further including
    eleventh means coupled to said incoming data signals and said control circuit to compare said incoming data bits with stored synchronization and address code words to generate an output when said incoming data signals correspond to said synchronization code word, said output being coupled to said control circuit for alignment thereof with a received synchronization code word.

9. The arrangement according to claims 2 or 3, wherein
    said third means includes
        eleventh means to generate said local bit sequences,
        twelfth means coupled to said eleventh means and said control circuit responsive to a signal from said control circuit to enable said eleventh means during said second bit periods,
        thirteenth means coupled to said incoming data signals and said eleventh means to compare said incoming data bits with said local bit sequences, and
        a counter coupled to said thirteenth means to count the number of comparison errors, said counter providing an input to said fourth means when the count thereof exceeds a preset number to cause said fourth means to disable said receiver for said further period of time.

10. The arrangement according to claim 9, further including
    fourteenth means coupled to said incoming data signals and said control circuit to compare said incoming data bits with stored synchronization and address code words to generate an output when said incoming data signals correspond to said synchronization code word, said output being coupled to said control circuit for alignment thereof with a received synchronization code word.

11. The arrangement according to claim 1, wherein said second means includes
    a first counter coupled to said fourth means,
    fifth means coupled to said first counter and said first means to enable said first counter to count data pulse edges during each of a predetermined duration, said first counter providing a first input to said fourth means when the count thereof exceeds a first preset number to cause said fourth means to disable said receiver for said further period of time.

12. The arrangement according to claim 11, wherein said third means includes
    sixth means to generate said local bit sequences,
    seventh means coupled to said sixth means and said control circuit responsive to a signal from said control circuit to enable said sixth means during said second bit periods,
    eighth means coupled to said incoming data signals and said sixth means to compare said incoming data bits with said local bit sequences, and
    a second counter coupled to said eighth means to count the number of comparison errors, said second counter providing a second input to said fourth means when the count thereof exeeds a second preset number to cause said fourth means to disable said receiver for said further period of time.

13. The arrangement according to claim 12, further including
    ninth means coupled to said incoming data signals and said control circuit to compare said incoming data bits with stored synchronization and address code words to generate an output when said incoming data signals correspond to said synchronization code word, said output being coupled to said control circuit for alignment thereof with a received synchronization code word.

14. The arrangement according to claim 1, wherein said third means includes fifth means to generate said local bit sequences, sixth means coupled to said fifth means and said control circuit responsive to a signal from said control circuit to enable said fifth means during said second bit periods, seventh means coupled to said incoming data signal and said fifth means to compare said incoming data bits with said local bit sequences, and a counter coupled to said seventh means to count the number of comparison errors, said counter providing an input to said fourth means when the count thereof exceeds a preset number to cause said fourth means to disable said receiver for said further period of time.

15. The arrangement according to claim 14, further including eighth means coupled to said incoming data signals and said control circuit to compare said incoming data bits with stored synchronization and address code words to generate an output when said incoming data signals correspond to said synchronization code word, said output being coupled to said control circuit for alignment thereof with a received synchronization code word.

16. The arrangement according to claim 1, further including fifth means coupled to said incoming data signals and said control circuit to compare said incoming data bits with stored synchronization and address code words to generate an output when said incoming data signals correspond to said synchronization code word, said output being coupled to said control circuit for alignment thereof with a received synchronization code word.

17. A method of synchronizing a digital radio pager receiver with incoming digital data signals comprising the steps of attaining bit synchronization of a receiver timing control circuit with incoming data bits within a predetermined number of bit periods from the time said receiver is switched on;

determining simultaneously whether said incoming signals are conveying valid data and whether said incoming signals contain a data sequence corresponding to a locally generated sequence;

causing said receiver to remain operative during a succeeding period of time when either or both portions of said determining step is or are successful and to discontinue its operation when the determining step is unsuccessful; and examining said incoming data signals during said succeeding period of time to determine whether it contains a data sequence corresponding to a selected one of a locally stored synchronization and address code word.

* * * * *